United States Patent
Frijlink et al.

(10) Patent No.: US 10,338,253 B2
(45) Date of Patent: Jul. 2, 2019

(54) METHOD OF SUPPRESSING SPECTRAL ARTEFACTS OF WAVEFIELD DECOMPOSITION CAUSED BY IMPERFECT EXTRAPOLATION

(71) Applicant: PGS Geophysical AS, Oslo (NO)

(72) Inventors: Martijn Frijlink, Leiden (NL); Rob Hegge, Leiden (NL); Rolf Baardman, Leiden (NL)

(73) Assignee: PGS Geophysical AS, Oslo (NO)

( * ) Notice: Subject to any disclaimer, the term of this patent is extended or adjusted under 35 U.S.C. 154(b) by 570 days.

(21) Appl. No.: 14/560,929

(22) Filed: Dec. 4, 2014

(65) Prior Publication Data

US 2015/0362610 A1    Dec. 17, 2015

Related U.S. Application Data

(60) Provisional application No. 62/012,621, filed on Jun. 16, 2014.

(51) Int. Cl.
*G01V 1/36* (2006.01)

(52) U.S. Cl.
CPC ...... *G01V 1/364* (2013.01); *G01V 2210/1293* (2013.01); *G01V 2210/1423* (2013.01)

(58) Field of Classification Search
CPC ........ G01V 1/30; G01V 1/282; G01V 1/3843; G01V 1/364; G01V 1/36; G01V 2210/1293; G01C 2210/1423
USPC .................. 702/6, 7, 8, 9, 10, 11, 12, 14, 17
See application file for complete search history.

(56) References Cited

U.S. PATENT DOCUMENTS

| | | | | |
|---|---|---|---|---|
| 4,849,945 A * | 7/1989 | Widrow | ................ | G01V 1/368 367/100 |
| 4,964,087 A * | 10/1990 | Widrow | ................ | G01V 1/368 367/40 |
| 6,049,507 A * | 4/2000 | Allen | ..................... | G01V 1/364 367/21 |
| 6,246,962 B1 * | 6/2001 | Schultz | ................. | G01V 1/364 702/17 |
| 6,446,008 B1 * | 9/2002 | Ozbek | .................... | G01V 1/364 367/45 |
| 7,773,204 B1 * | 8/2010 | Nelson | ................... | G01S 13/48 356/5.02 |
| 8,010,294 B2 * | 8/2011 | Dorn | ....................... | G01V 1/30 702/14 |
| 8,165,815 B2 * | 4/2012 | Hornbostel | ........... | G01V 3/083 702/9 |
| 8,386,180 B2 * | 2/2013 | Davies | ................... | G01V 11/00 166/250.01 |
| 8,473,264 B2 * | 6/2013 | Barnes | ..................... | G01V 7/16 702/14 |
| 2002/0042702 A1 * | 4/2002 | Calvert | ................. | G01V 1/282 703/10 |
| 2009/0259404 A1 * | 10/2009 | Hirabayashi | ............ | G01V 1/48 702/9 |

(Continued)

*Primary Examiner* — Tan T. Nguyen
(74) *Attorney, Agent, or Firm* — Patterson + Sheridan LLP

(57) ABSTRACT

Artefacts arising from imperfect extrapolation of a data set subjected to filtering operation are removed by forming a model of the extrapolated data, performing a filtering process on the model and the data set to form a filtered model and a filtered data set, and adaptively subtracting the filtered model from the filtered data set. The adaptive subtraction may employ a least-square error filter.

24 Claims, 5 Drawing Sheets

(56) References Cited

U.S. PATENT DOCUMENTS

| | | | |
|---|---|---|---|
| 2014/0078860 A1* | 3/2014 | Poole | G01V 1/36 367/7 |
| 2015/0153473 A1* | 6/2015 | Smith | G01V 3/12 702/11 |
| 2015/0212222 A1* | 7/2015 | Poole | G01V 1/36 702/14 |
| 2015/0316683 A1* | 11/2015 | Purves | G01V 1/30 703/2 |

* cited by examiner

METHOD OF SUPPRESSING SPECTRAL ARTEFACTS OF WAVEFIELD DECOMPOSITION CAUSED BY IMPERFECT EXTRAPOLATION

CROSS-REFERENCE TO RELATED APPLICATIONS

This application claims benefit of U.S. Provisional Patent Application Ser. No. 62/012,621 filed Jun. 16, 2014, which is incorporated herein by reference.

BACKGROUND

In marine geophysical data acquisition, measurements may be taken of wavefields that have been initiated by geophysical energy sources such as air guns, marine vibrators, electric bipole antennae, and magnetic coils. The geophysical energy sources may be positioned at known locations in a geographic area. In a marine setting, the sources may be towed behind one or more boats traveling a prescribed course, usually a group of aligned paths. The geophysical sources are caused to emit energy. For example, when the geophysical source is a seismic source, sonic pulses are emitted, and sensors record reflected sonic waves as voltages from transducers. The data received may be compiled into a data set with time and distance along and across the sampling paths. Such data is commonly used to prospect for geologic resources such as oil and gas deposits.

The data set obtained typically contains information of interest indicating the geology of earth strata below the geophysical equipment. Unfortunately, however, the geologic information is usually obscured by substantial noise from a wide variety of sources. Coherent noise sources, such as hydrostatic pressure variations, cavitation of boat propellers, and seismic interference, are usually well-defined and easily removed. Incoherent noise sources, however, such as tugging noise caused by sudden movements of a vessel or sensor due to wave motion, strumming or vibration of cables, and swell noise, are more difficult to remove.

Conventional methods of processing the data set include performing integral transform operations, such as Fourier transforms and/or Radon transforms, on the data set. Such operations may lead to mathematical incompatibilities. For example, Fourier transforms are defined for functions or data with domain of infinite extent, whereas recorded data is only available in a domain of finite extent. Prior to performing a Fourier transform on recorded data, an extrapolation is typically applied at the edges of the domain of the data set to smooth the edges numerically. These operations frequently produce spectral artefacts in the data. There is a need to remove such artefacts.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
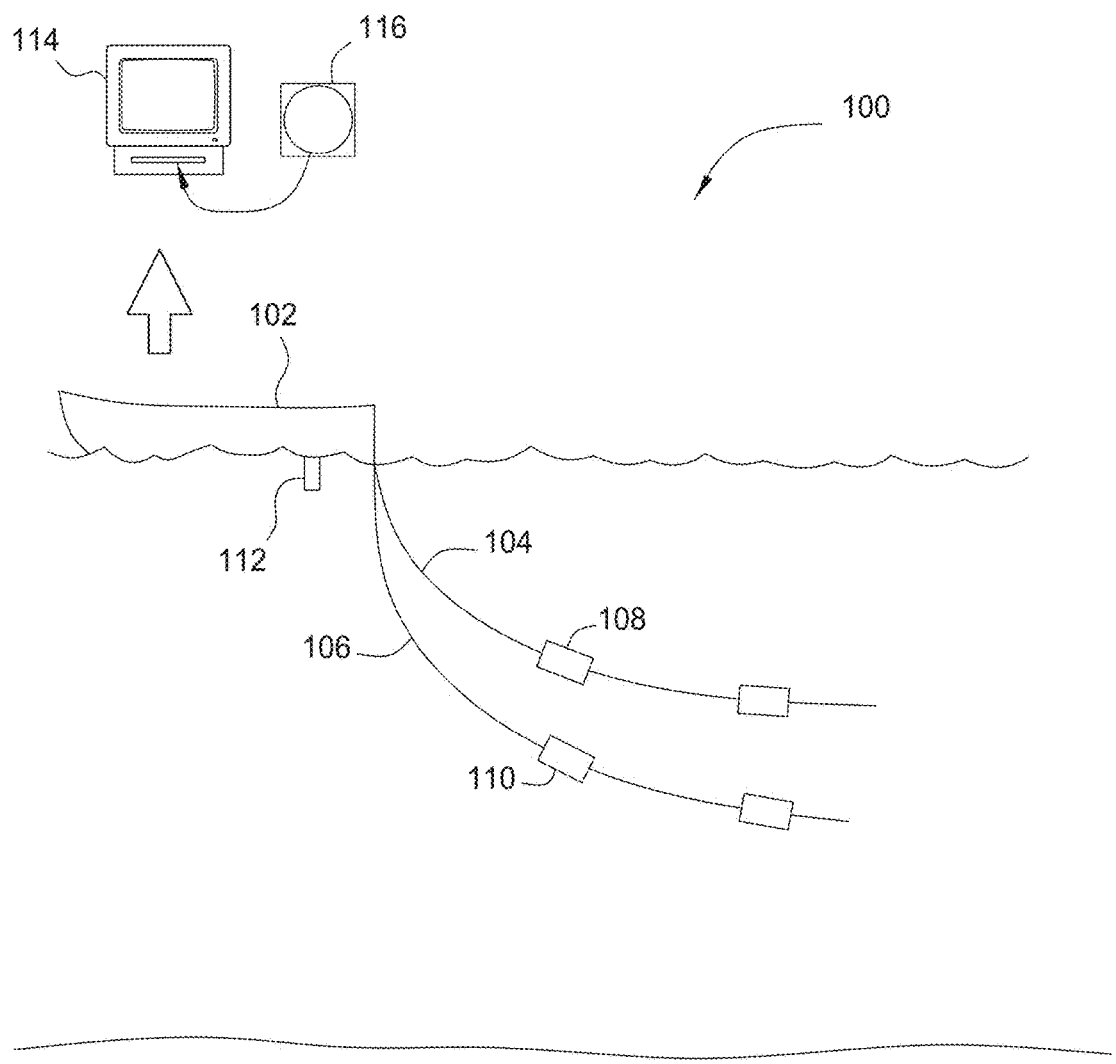
FIG. 1 is an activity diagram showing a data acquisition scheme according to one embodiment.

FIG. 1 is an activity diagram showing a typical data acquisition scheme 100 in a marine context. The data acquisition scheme 100 is an arrangement typically used for geophysical prospecting in a marine environment. A vessel 102 tows a first streamer 104 and a second streamer 106 in the water behind the vessel. The first streamer 104 has a first sensor 108, and the second streamer 106 has a second sensor 110. In a typical marine data acquisition situation, a vessel may have any suitable number of streamers, each with multiple sensors. An energy source 112, which may be attached to the vessel 102 or displaced from the vessel 102 by any suitable extension, or attached to or displaced from another vessel (not shown), emits energy. In the marine context, the energy may propagate through the water and may reflect and/or refract from the various surfaces of water and geologic features. The sensors 108/110 may detect the resultant wavefield.

The sensors 108/110 may have a fixed relationship with respect to each other that may be accounted for mathematically. The sensors 108/110 may also measure different aspects of the wavefield that may be related mathematically. For example, a geophone and a hydrophone typically measure particle velocity and pressure respectively, which may be related mathematically. Any number of streamers may be used, and multiple vessels may be used. Streamers may have any number of sensors, which may be the same or different types. Commonly used sensors in a marine gather include geophones, hydrophones, and accelerometers. Since each streamer may exhibit a different depth profile, the sensors on any particular streamer may be at a different or the same depths, and sensors on different streamers may likewise be at different or the same depths.

The data-processing systems and methods described herein may be used to produce a geophysical data product. The physical data collected from the sensors 108/110, depicting real-world signals and vibrations from the physical environment, forms a primary record of the wavefield that may be represented and stored in a computer 114 or on a computer readable medium 116 that may be inserted into the computer 114. The computer readable medium 116, which is not a transitory signal medium, may contain the raw data collected from the sensors 108/110, or a product data set made by processing the raw data according to methods described herein. More than one product data set, each formed by performing a different process on the raw data, may be stored on the computer readable medium 116. The computer readable medium 116 may contain instructions for performing methods described herein, in addition to, or instead of, the raw data or the product data set, or instructions for transferring data to another computer readable medium for further processing. The physical data may additionally be transformed by certain methods described below and implemented in the computer 114, which may also be stored on the computer readable medium 116 as instructions for performing any of the methods described below. Computer readable media that may store various embodiments include rotationally operated magnetoresistive memory devices such as floppy disks, hard disks, stationary magnetoresistive memory devices such as flash drives, and optical disks. Additionally, data products and instructions for computer execution of methods described herein may be transmitted by wire or wirelessly. The geophysical data product may be produced offshore (i.e. by data-processing equipment on a survey vessel) or onshore (i.e. at a data-processing facility on land) either within the United States or in another country. When the geophysical data product is produced offshore or in another country, it may be imported onshore to a facility in the United States. Once onshore in the United States, geophysical analysis may be performed on the geophysical data product.

The data collected in such a scheme may be reduced to a table or matrix of numbers $A(x)$ where $x_0 \leq x \leq x_n$, where $x=(x_1, x_2, x_3, \ldots, x_d)$ is a domain with d indices, and $n=(n_1, n_2, n_3, \ldots, n_d)$, where $n_i$ is the number of samples along the ith index so that $x_{i,n_i}$ is the last location in the ith index and $A(x_{i,n_i})$ is the last data point in the data set along the ith index. In this application, bold font used in mathematical expressions indicates mathematical objects of non-zero rank, such as vectors and tensors. Spectral analysis using integral transforms is commonly performed on the data set to identify and separate component frequencies indicative of geologic information. The integral transform converts space and time domain data to an alternate domain, such as frequency and/or wavenumber domains. The general integral transform is $$A^T = T(A) = \int_v Af(v) dv \qquad (1)$$

where $f(v)$ is the kernel of the integral transform. As such, the integral transform may be a multi-dimensional transform. The domain v of the kernel $f(v)$ typically includes the domain x of the raw data set $A(x)$ and at least one transform index, $\alpha_i$, each transform index corresponding to an index of the raw data set $A(x)$. Thus, defining $v=x \cup \alpha$, we may express some integral transforms as $$A^T(\alpha) = T(A(x)) = \int_x A(x) f(x, \alpha) dx \qquad (2)$$

Commonly used integral transforms include, but are not limited to, the Fourier transform, the Laplace transform, the Radon transform, and the Z transform. For discrete indexed data sets, such transforms are often performed numerically using known algorithms. For seismic applications, the raw data set $A(x)$ is typically indexed by two or three spatial dimensions, such as inline offset, crossline offset, and depth, and time, so $x=(x_1, x_2, x_3, t)$ where three spatial dimensions are represented. Integral transforms such as Laplace and Fourier transforms performed on such data sets typically transform time into frequency and may transform one or more spatial dimensions into wavenumbers or, in the case of the Radon transform, inverse velocities, also referred to as "slowness".

Because the raw data set $A(x)$ is collected over a certain geographic area in a fixed duration of time, the data set has a finite domain or "aperture". The finite aperture creates a discontinuity at the edges of the domain, where on one side there is non-zero data, and on the other side, zero. Generally, such discontinuities in a data set give unwanted results when performing integral transforms defined on infinite apertures, and at the edges of a finite data set, the integral transform typically yields unsatisfactory artefacts. To mitigate such effects, the data set may be tapered by adding extension data $A(x_n+\Delta)$ beyond the domain of the raw data set $A(x)$. Here, $\Delta$ is the extension domain that extends the data set beyond the finite physical domain x over which the data was collected so that the extended domain is $e=x \cup x_n+\Delta$, and $x_n$ represents an edge of the original domain, either an edge at the positive extreme or at the negative extreme of the original domain. The extension data may be an apodization function, and may employ weighting functions such as window functions or taper functions to smooth the edges of the raw data set $A(x)$. In one aspect, data may be extrapolated through the extension domain using an extrapolation function $E(x_n+\Delta)$. The extrapolation function may be a generating function that operates on some subset on the raw data $A(x)$, or the extrapolation function $E(x_n+\Delta)$ may be set to $A(x_n)$ for all values of $\Delta$. To form the extended data set, the domain of the original data set is extended from x to $x+\Delta$, the values of the original data set are optionally extrapolated through the extended domain using the extrapolation function, $E(x_n+\Delta)$, and a taper function $t(x_n+\Delta)$ may be applied as weighting factors to taper the edges smoothly to zero, with a similar operation applied on the extended domain below the original domain, so that $A(x_n+\Delta)=E(x_n+\Delta)t(x_n+\Delta)$. In an embodiment where the extrapolation function is set to $A(x_n)$ for all values of $\Delta$, $A(x_n+\Delta)=A(x_n)t(x_n+\Delta)$.

A window function may be used. One example is the "Hanning taper", which smoothly tapers data from the edge of the physical-domain data set to zero over a selected extrapolation domain by a cosine function. The taper function, according to the notation above, is as follows:

$$t(x_n + \Delta) = 1 - \cos\left(\frac{\pi \Delta}{2\Delta_m}\right), \qquad (3)$$

where $\Delta_m$ is an extremity of the extrapolation domain, either at the positive end or the negative end, and $\Delta_{mi}$ is an end value of the extrapolation domain for the index i. If the extent of the extrapolation domain is parameterized on the domain itself, such that $\Delta_m = \alpha(x_0 - x_n)$, then $$t(x_n + \Delta) = 1 - \cos\left(\frac{\pi \Delta}{2\alpha(x_0 - x_n)}\right), \qquad (4)$$

which may be applied at either end of the domain. It should be noted that m may be a scalar quantity if the same number of extrapolation data points is added to each index, or a non-scalar quantity if different numbers of data points are added to different indices to perform the taper along those indices. Functions such as the Hanning taper are commonly selected because they Fourier transform to spike functions with very localized impacts on the transformed data set.

Figure 2:
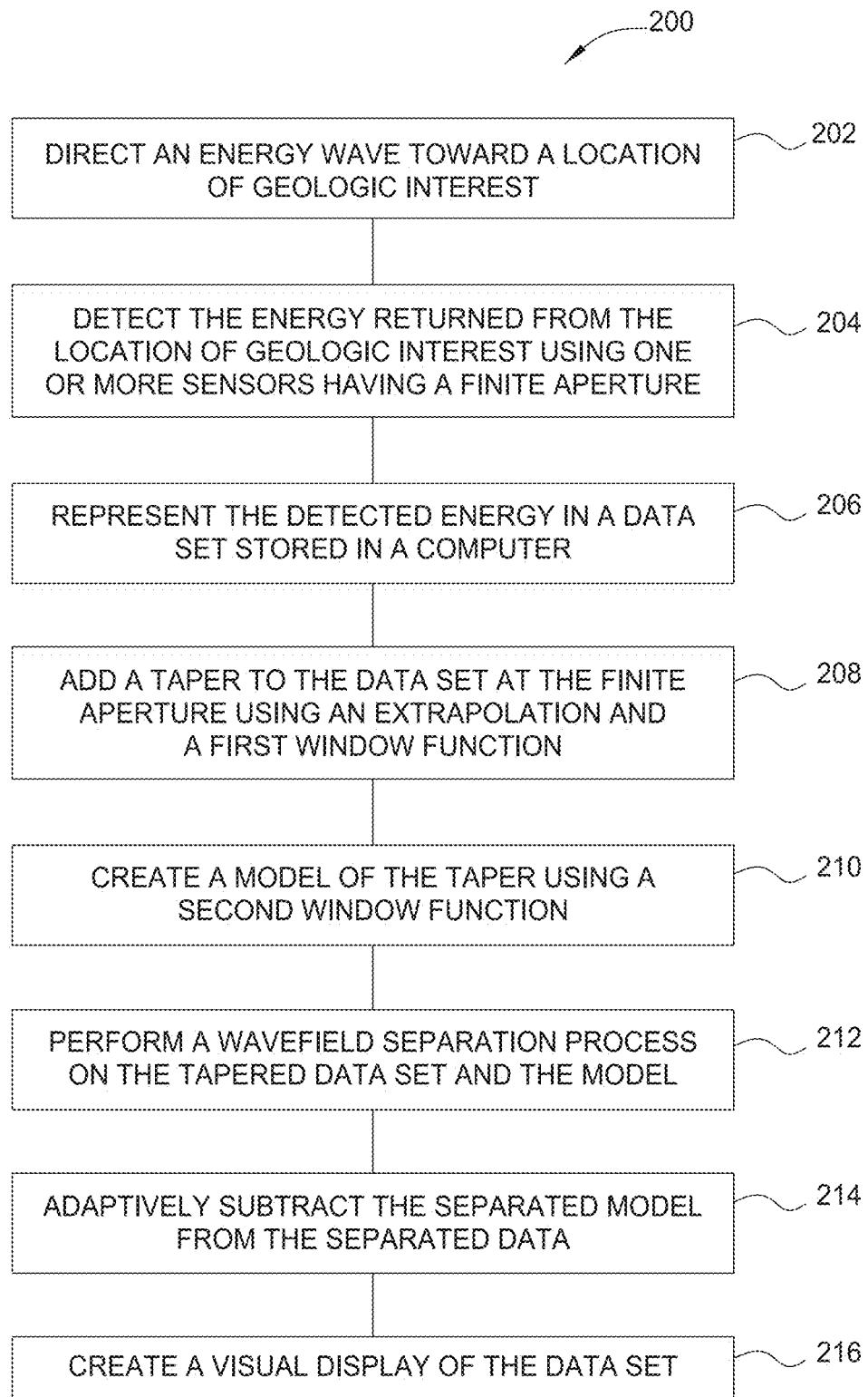
FIG. 2 is a flow diagram summarizing a method according to another embodiment.

To remove spectral artefacts caused by imperfect extension of a data set, the artefacts may be modeled from the form of the extension, and the model artefacts adaptively subtracted from the data. FIG. 2 is a flow diagram summarizing a method 200 according to one embodiment. At 202, one or more energy waves is directed toward a location of geologic interest in a land or marine setting, for example in a geophysical prospecting operation. The energy wave may be seismic or electromagnetic, and may be an impulse-type energy wave having a large amplitude and very fast decay, or an oscillation-type energy wave having a selected amplitude and duration over many cycles of the wave. The energy wave propagates into the location of geologic interest perturbing solids and liquids in the earth, where the energy is refracted and reflected.

At 204, energy that returns from the location of geologic interest is detected using one or more sensors. The sensors may be acoustic sensors or electromagnetic sensors. The acoustic sensors may be pressure sensors or particle velocity sensors, and the electromagnetic sensors may be voltage or current sensors. Because the sensor readings are collected over a finite geographical area in a finite duration, the readings, and the data set created from those readings, have a finite aperture.

At 206, the sensors generate signals representing the detected energy, and the signals are converted to numbers and stored in a computer memory as a data set $A(x)$ representing geological features and physical phenomena of the sampled location. The data set $A(x)$ may also be stored on a movable media, such as a magnetic or optical disk, for transportation to a computer system for analysis and rendering, or otherwise entered into a computer.

At 208, the data is tapered at the finite aperture using an extrapolation and a first window function, as described above. The first window function may be the Hanning taper, or another window function, such as any of the higher-order B-spline windows, generalized cosine windows, or generalized Gaussian windows. As noted above, the domain of the data set is extended along every dimension to be tapered (note that only dimensions for which integral transforms are to be computed need be tapered). The data is extrapolated from the final recorded data point $A(x_n)$ or any desired function of the data at the edge of the domain, such as an edge average, through the extrapolation domain. The taper weights are then applied to the extrapolated data to achieve the taper. In the case of the Hanning taper applied to the final recorded data point at the edge of the domain, the operation may be as follows:

$$A(x_n + \Delta) = A(x_n)\left[1 - \cos\left(\frac{\pi\Delta}{2\Delta_m}\right)\right], \quad (5)$$

where the extent of the extrapolation domain, $\Delta_n$, is selected to provide the desired taper length, and the domain $\Delta_n$ may include quantities below and above the original domain $x_n$. The tapered data set is thus given by $$A(e) = \begin{cases} A(x) \text{ for } x_0 \leq e \leq x_n \\ A(x_n)\left[1 - \cos\left(\frac{\pi\Delta}{2\Delta_m}\right)\right] \text{ for } e > x_n \end{cases}, \quad (6)$$

$$A(e) = \begin{cases} A(x_0)\left[1 - \cos\left(\frac{\pi\Delta}{2\Delta_{m-}}\right)\right] \text{ for } e < x_0 \\ A(x) \text{ for } x_0 \leq e \leq x_n \\ A(x_n)\left[1 - \cos\left(\frac{\pi\Delta}{2\Delta_{m+}}\right)\right] \text{ for } e > x_n \end{cases}, \quad (7)$$

At 210, a model $M(e)$ of the taper is created using a second window function $w(e)$. The second window function typically has non-zero values over the extrapolation domain $\Delta$ or a portion thereof, and the model of the taper is created by multiplying the second window function and the tapered data set:

$$M(e) = A(e)w(e) \quad (8),$$

The window function $w$ may be selected to be compatible with the first window function $t$, for example by selecting functions that have a similar transform. In the embodiment wherein $t$ is a trigonometric function, such as the Hanning taper example above, a trigonometric function may also be selected for the second window function $w$, as follows:

$$w(e) = \begin{cases} 1 + \cos 2\pi\left[\frac{e - x_0}{\Delta_{m-}} - \frac{1}{2}\right] \text{ for } e \leq x_0 \\ 0 \text{ for } x_0 \leq e \leq x_n \\ 1 + \cos 2\pi\left[\frac{e - x_n}{\Delta_{m+}} - \frac{1}{2}\right] \text{ for } e \geq x_m \end{cases}, \quad (9)$$

At 212, a spectral filtering operation, such as a wavefield separation operation, is performed on the tapered data set to form a filtered data set, in which upgoing and downgoing wavefields may be separated, and on the model set to form a filtered model set. A wavefield separation operation typically includes performing an integral transform operation to one or more frequency or wavenumber domains, applying one or more filters, and then reversing the integral transform. Commonly used integral transforms are described above.

Wavefield separation is performed in the frequency-wavenumber domain by removing the spectral effects of interference from reflections. In a wavefield separation process, wherein wave-indicating data that contains wave train information propagating in different directions, for example upgoing and downgoing wavefields, are sorted into signals representing the separate wave trains. In one type of wavefield separation, geophysical data may be represented as pressure, which is a function of spatial coordinates and time $p(x,t)$, and can be transformed to a frequency domain by computing the Laplace transform over time and the Fourier transform over horizontal spatial coordinates:

$$p^L(x, s) = \int_t e^{-st} p(x, t) dt, \quad (10a)$$

$$p^F(is\alpha_1, is\alpha_2, x_3, s) = \int_{(x_1, x_2)} e^{is(\alpha_1 x_1 + \alpha_2 x_2)} p^L(x, s) dA, \quad (10b)$$

where $\alpha_1$ and $\alpha_2$ are components of wave slowness, or reciprocal velocity, in the horizontal directions. The transformed pressure data may then be scaled by an exponential function of depth, depending on arrangement of sources and receivers. For example, $$P(is\alpha_1, is\alpha_2, x_3, s) = \frac{e^{s\Gamma x_3}}{2\sinh(s\Gamma x_3^R)} p^F(is\alpha_1, is\alpha_2, x_3, s), \quad (11)$$

where $x_3^R$ refers to the depth of a receiver that generated the original data $p(x,t)$ and $$\Gamma = \sqrt{\frac{1}{c^2} + \alpha_1^2 + \alpha_2^2},$$

with $=\sqrt{\kappa\rho}$, where $\kappa$ is fluid compressibility and $\rho$ is fluid density. The result, $P(is\alpha_1, is\alpha_2, x_3, s)$, is then transformed back to space and time (reverse Fourier and reverse Laplace) to form a patterned data set $p'(x,t)$. In this embodiment, the patterned data set is a wavefield separated data set. Prior to reverse transformation, other filters and scaling operations, such as simple low or high frequency filters, may be applied.

Scaling may be applied using a simple coefficient matrix in the spectral domain, which may approximate any desired function. Filtering may be applied to remove any frequency ranges deemed appropriate. A scaling/filtering function $\Phi$ may be applied as follows:

$$Z = A^T \circ \Phi \quad (12a)$$

$$H = M^T \circ \Phi \quad (12b),$$

where $\Phi$ is a coefficient tensor computed to have a desired effect on the data set, for example, removing certain frequency domains from the data set or applying a patterned transformation to the data set such as an exponential smoothing or filtering, and $\circ$ denotes the Hadamard product or component-wise product.

The inverse of the original integral transform may be applied to the separated data set to return the data to a space and time domain having the physical significance of representing geologic structures in the area of interest. The inverse integral transform is an operation of the form:

$$T^{-1}(Z) = \int_w f^{-1}(w) Z dw \quad (13),$$

where $f^{-1}(w)$ denotes an integral transform kernel that is an inverse of the kernel $f(v)$ with respect to the integral transform. Complimentarily, the domain w of the inverse kernel $f^{-1}$ is typically the same as the domain v of the original kernel f. The same spectral filtering operation may be applied to the tapered data set A(e) and the model data set M(e) to form a filtered data set $A_S$(e) and a filtered model set $M_S$(e) given by:

$$A_S = T^{-1}(Z) = \int_w f^{-1}(w) Z dw = \int_w \int_v f^{-1}(w) \Phi \circ Af(v) dv dw \quad (14a)$$

$$M_S = T^{-1}(H) = \int_w f^{-1}(w) H dw = \int_w \int_v f^{-1}(w) \Phi \circ Mf(v) dv dw \quad (14b)$$

where $v = e + \alpha$ is defined as above. A particular integral transform may be said to be analytic if $T^{-1}T(X) = X$. An integral transform may be said to be quasi-analytic if $T^{-1}T(X) \approx X$. In the case of a quasi-analytic integral transform, $T^{-1}T(X) = X + \partial X$, where $\partial X$ is smaller than a selected threshold criterion. The spectral filtering operation applied to the tapered data set and the model data set may be identical, using the same integral transform and the same filter function $\Phi$ for both so that the filtered data set and the filtered model set are mathematically compatible, or a first filter function may be used with the tapered data set and a second filter function different from the first filter function may be used with the model set.

An integral transform is performed on the original data set A(x) to form a transformed data set. The same integral transform is also performed on the model data set M(e) to form a transformed model set. A first filter is applied to the transformed data set to form a filtered transformed data set. A second filter is applied to the transformed model set to form a filtered transformed model set. The second filter may be the same as the first filter, or different. An inverse of the integral transform is applied to the filtered transformed data set to form the filtered data set $A_S$. The filtered data set $A_S$ may have artefacts arising from the taper by mathematical operation of the integral transform, filters, and inverse integral transform on the taper. The inverse of the integral transform is also applied to the filtered transformed model set to form the filtered model $M_S$. The filtered model $\underline{M}_S$ may be a model of the artefacts in the filtered data set $\underline{A}_S$.

At 214, the filtered model $M_S$ is adaptively subtracted from the filtered data set $A_S$ to form a product data set. The adaptive subtraction process may be a least-squares error process that minimizes the square of the element by element difference between the filtered data set and the filtered model. A least-squares filter is found that, when multiplied with the filtered model or the filtered data set, minimizes the quantity obtained by subtracting the two data sets, element by element, squaring each element of the result, and adding each squared element together. One example of the least-squares filter that may be used is a Wiener filter. Using the least-squares filter, the filtered model is subtracted from the filtered data set to remove extrapolation artefacts, thus forming a product data set. In the example of the Wiener filter, the filter is a coefficient matrix that is multiplied by the filtered model to give a subtrahend, which, when subtracted from the filtered data set, removes extrapolation artefacts from the filtered data set.

The adaptive subtraction process may be aided in some circumstances by aligning the filtered model with the filtered data set according to a known metric prior to performing the adaptive subtraction. Frequently, a temporal alignment is performed to remove the time variable from the adaptive subtraction process, thus reducing processing to converge at the lowest-energy result.

As noted above, the original data set may be a seismic data set, for example a data set of pressure readings as a function of three spatial dimensions and time, or an electromagnetic data set, for example a data set of voltage or current readings as a function of three spatial dimensions and time. In one embodiment, the process of constructing a model data set, applying a spectral filtering operation to both the model and tapered data sets, and adaptively subtracting the filtered model from the filtered data set may be performed separately at each end of the domain e. A model of the taper at a first extremity of the domain may be constructed, and the spectral filtering and adaptive subtraction processes applied, and then a model of the taper at a second extremity of the domain, opposite from the first extremity, may be constructed, and the spectral filtering and adaptive subtraction processes applied a second time to complete removal of extrapolation artefacts.

The various embodiments of the method 200 described above may be performed using a computer or a collection of computers, operating locally or over a network, to perform the mathematical operations. Numerical methods are typically used to perform the integral transforms, the statistical operations, and the least-squares regression and fitting. Using the method 200, artefact removal is postponed until after transformation, scaling and filtering, and inverse transformation of the original data set. The product data set obtained after artefact removal may be stored on a physical, non-transitory medium for distribution or transportation, if desired. The method 200 increases the clarity of geologic features represented in the product data set, versus the original data set without the artefacts removed, so that when a visual display of the product data is created, for example, geologic features of interest are more easily discernable in the visual display. The product data set may also be used as part of a data product, as described above.

Figure 3A:
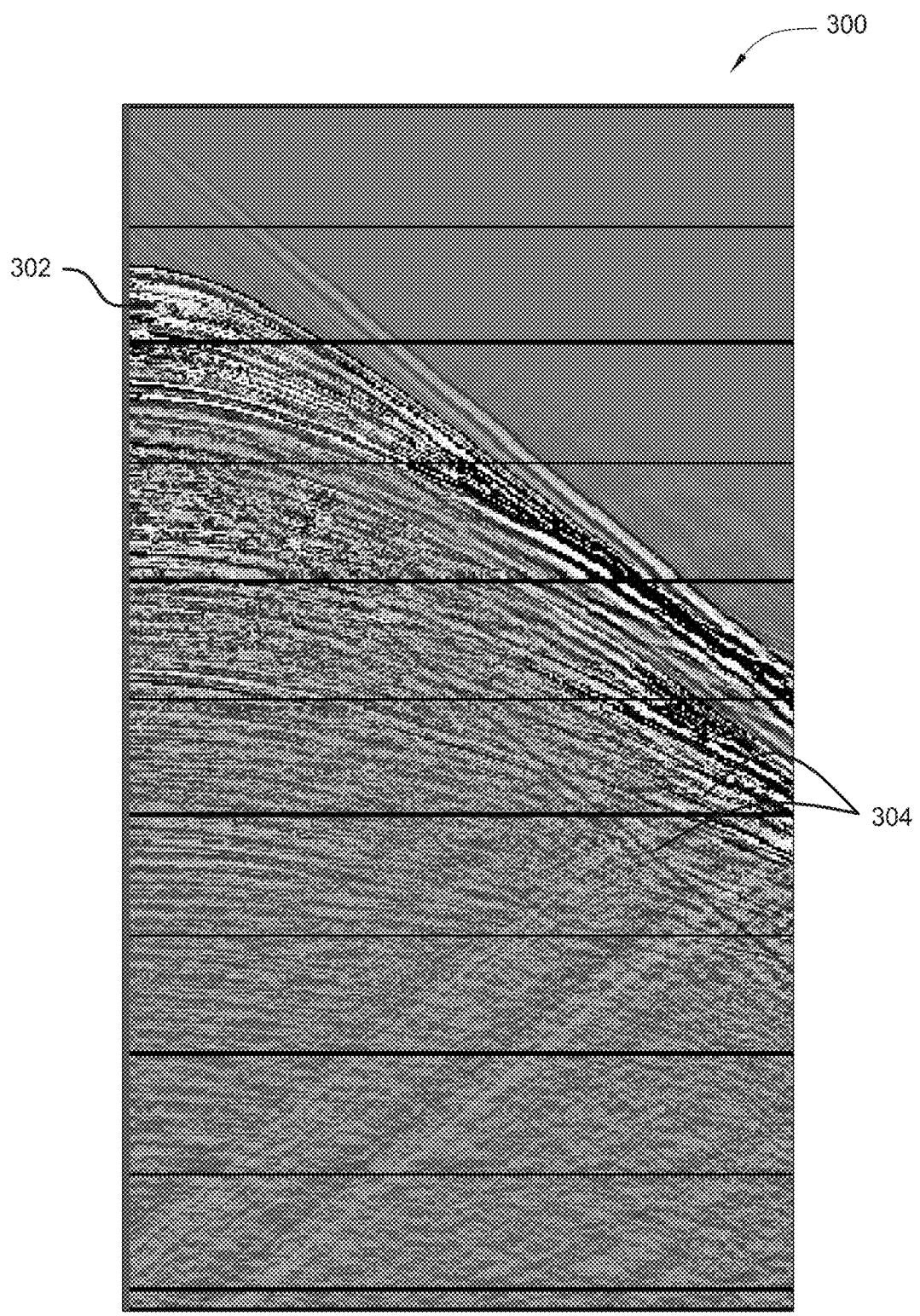
FIG. 3A is a representation of data from a geophysical survey.
Figure 3B:
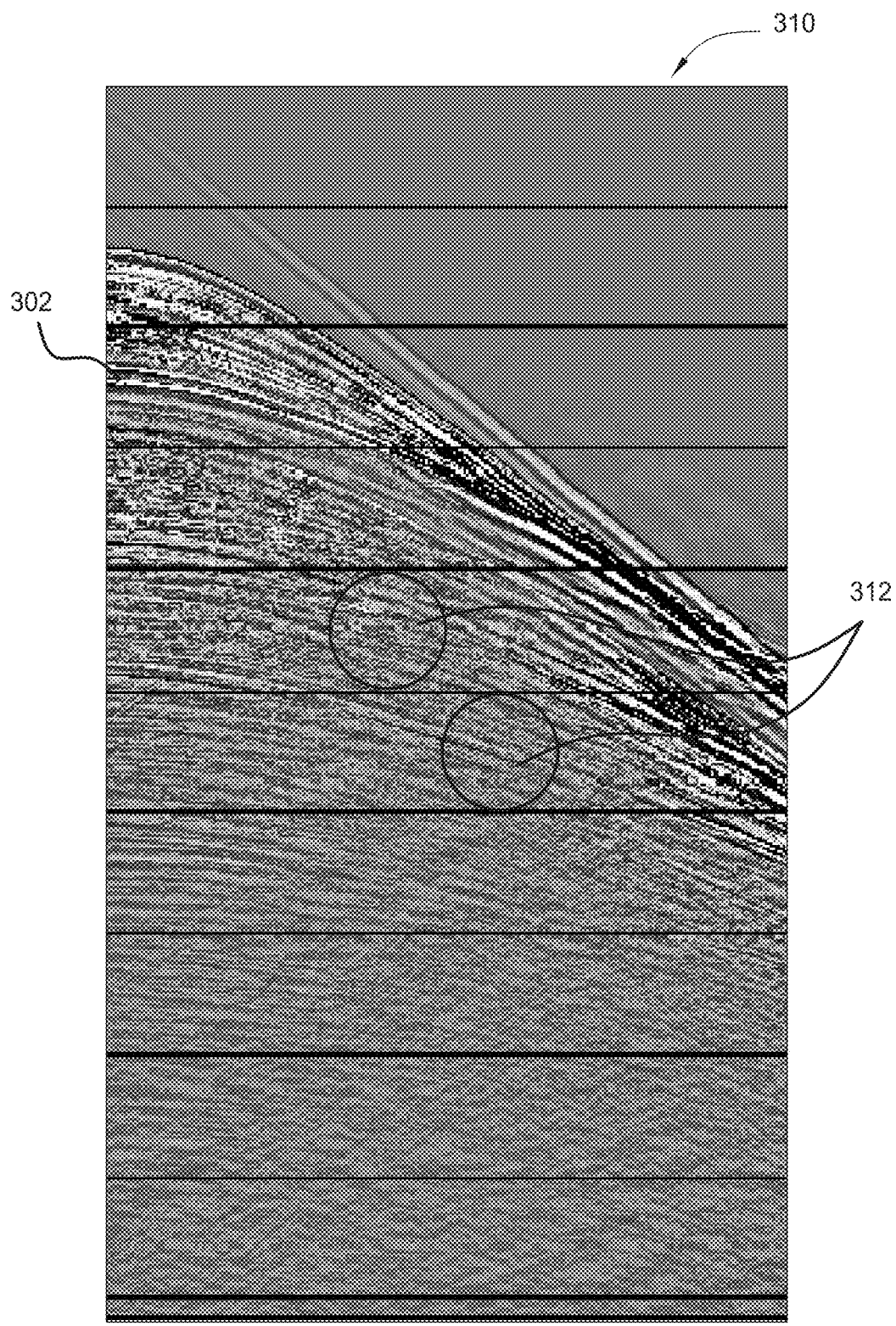
FIG. 3B is a representation of the data of FIG. 3A following application of the method of FIG. 2.
Figure 3C:
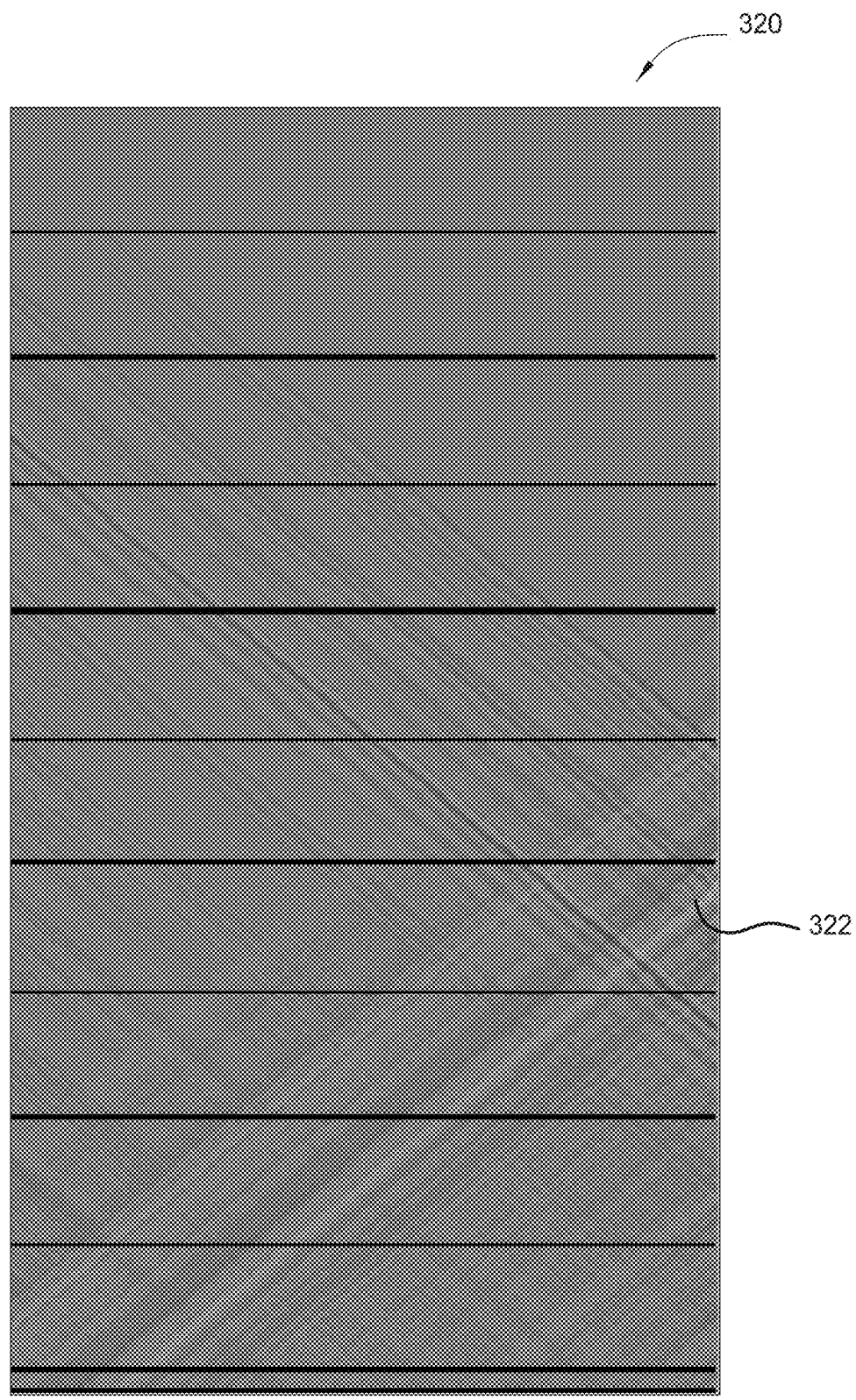
FIG. 3C is a representation of artefacts removed from the data of FIG. 3A by application of the method of FIG. 2.

FIG. 3A is a graph 300 showing sensor data 302 collected during a geophysical survey. The various lines and contours of the sensor data 302 may represent geological features of the area surveyed, with identifiable artefacts such as the lines 304 introduced by application of wavefield separation to a tapered data set. FIG. 3B is a graph 310 showing the data of FIG. 3A after application of an embodiment of the method 200 of FIG. 2. Application of the method has clarified the representation of the features of interest in the data 302, and the visual representation of the data 302, such that potential geologic features are more visible, for example in the areas 312. It is evident from comparing FIGS. 3A and 3B that artefacts introduced into the data by the taper and wavefield separation processes have been removed by application of the method 200. FIG. 3C is a graph 320 obtained by subtracting the data of the graph 310 of FIG. 3B from the data of the graph 300 of FIG. 3A. The graph 320 shows the artefacts 322 that were removed from the data 302 of the graph 300 of FIG. 3A.

While the foregoing is directed to embodiments of the invention, other and further embodiments of the invention may be devised without departing from the basic scope thereof.

What is claimed is:

1. A method of geophysical prospecting, the method comprising:
    obtaining a data set having a finite aperture, wherein the data set is formed by:
        directing an energy wave toward a location of geologic interest,
        detecting the energy returned from the location of geologic interest using one or more finite-aperture sensors configured to collect readings over a finite geographical area in a finite duration, and
        representing the detected energy in a data set stored in a computer;
    increasing clarity of geologic features represented in the data set by removing spectral artefacts from the data set using a process, the process comprising:
        adding a taper to the data set at a boundary of the finite aperture using an extrapolation and a first window function to form a tapered data set;
        storing the tapered data set in the computer;
        creating a model of the taper using a second window function, wherein the first window function and the second window function are trigonometric functions;
        storing the model in the computer;
        performing a spectral filtering operation on the tapered data set and the model to form a filtered data set having spectral artefacts arising from the taper and a model of the spectral artefacts;
        storing the filtered data set and the model of the spectral artefacts in the computer; and
        adaptively subtracting the model of the spectral artefacts from the filtered data set to form a product data set;
    creating a visual display of the product data set; and
    using the visual display to identify prospective geologic resources.

2. The method of claim 1, wherein adaptively subtracting the model of the spectral artefacts from the filtered data set comprises performing a least-squares error minimization.

3. The method of claim 2, further comprising temporally aligning the filtered data set and the model of the spectral artefacts prior to adaptively subtracting the model of the spectral artefacts from the filtered data set.

4. The method of claim 1, wherein the data set has a domain with more than one dimension, and the process of increasing clarity of geologic features represented in the data set is performed separately on each dimension of the domain.

5. The method of claim 1, wherein performing the spectral filtering process on the tapered data set and the model includes performing a wavefield separation process on the tapered data set and the model.

6. The method of claim 5, wherein the wavefield separation process comprises:
    performing an integral transform;
    applying a filter; and
    performing a reverse of the integral transform.

7. A visual display of a data product, the data product comprising:
    a non-transitory storage medium containing geophysical sensor readings in a product data set derived from an initial data set from which spectral artefacts have been removed by a process comprising:
        adding a taper to the initial data set using an extrapolation and a first window function to form a tapered data set;
        creating a model of the taper using a second window function;
        performing a spectral filtering operation on the tapered data set and the model to form a filtered data set having spectral artefacts arising from the taper and a model of the spectral artefacts; and
        adaptively subtracting the model of the spectral artefacts from the filtered data set to form the product data set, wherein the visual display is configured to be used to identify prospective geologic resources.

8. The visual display of claim 7, wherein the initial data set has a domain with more than one dimension, and the process of removing spectral artefacts from the initial data set is performed separately on each dimension of the domain.

9. The visual display of claim 7, wherein performing the spectral filtering operation on the tapered data set and the model includes performing a wavefield separation process on the tapered data set and the model.

10. The visual display of claim 9, wherein the wavefield separation process comprises:
    performing an integral transform;
    applying a filter; and
    performing a reverse of the integral transform.

11. The visual display of claim 7, wherein adaptively subtracting the model of the spectral artefacts from the filtered data set comprises performing a least-squares minimization.

12. The visual display of claim 11, wherein the process further comprises temporally aligning the filtered data set and the model of the spectral artefacts prior to adaptively subtracting the filtered model from the filtered data set.

13. The visual display of claim 7, wherein the first window function and the second window function are trigonometric functions.

14. A method of clarifying geologic features represented in geophysical survey data, comprising:
    entering a data set into a computer, the data set representing sensor readings obtained from a geophysical survey;
    smoothing the data set at the edges of the data set by applying a taper function to form a tapered data set;
    forming a model representing the tapered portion of the tapered data set;
    separating upgoing and downgoing wavefields in the tapered data set by applying a first spectral filtering operation to form a filtered data set having spectral artefacts arising from applying the taper function;
    performing a second spectral filtering operation on the model to form a model of the spectral artefacts; and
    removing the spectral artefacts arising from the taper function from the filtered data set by adaptively subtracting the model of the spectral artefacts from the filtered data set to form a product data set.

15. The method of claim 14, wherein the first spectral filtering operation includes a first wavefield separation operation, and the second spectral filtering operation includes a second wavefield separation operation.

16. The method of claim 15, wherein the first spectral filtering operation comprises performing an integral transform on the tapered data set to form a transformed data set, applying a first filter to the transformed data set to form a filtered transformed data set, and performing an inverse of the integral transform on the filtered transformed data set to form the filtered data set.

17. The method of claim 14, wherein the data set has a domain with more than one dimension, and the smoothing the data set, forming the model, separating upgoing and downgoing wavefields, performing the second spectral filtering operation, and removing the spectral artefacts are all performed separately on each dimension of the domain.

18. The method of claim 14, wherein adaptively subtracting the model of the spectral artefacts from the filtered data set comprises performing a least-squares energy minimization process using the model of the spectral artefacts and the filtered data set.

19. The method of claim 18, wherein adaptively subtracting the model of the spectral artefacts from the filtered data set further comprises temporally aligning the model of the spectral artefacts and the filtered data set.

20. The method of claim 14, wherein applying a taper function to form a tapered data set includes applying a first window function to the data set, forming a model representing the tapered portion of the tapered data set includes applying a second window function to the tapered data set, and the first and second window functions are each trigonometric functions.

21. The method of claim 14, further comprising creating a visual display of the product data set and using the visual display to identify prospective geologic resources.

22. An improved method of increasing clarity of geologic features represented in a data set having a finite aperture by removing spectral artefacts from the data set using a process, the improvement of the method comprising: creating a model of a taper for the data set, and adaptively subtracting a model of the spectral artefacts from a filtered data set, the process comprising:
adding the taper to the data set at a boundary of the finite aperture using an extrapolation and a first window function to form a tapered data set;
creating the model of the taper using a second window function;
performing a spectral filtering operation on the tapered data set to form the filtered data set, wherein the filtered data set has spectral artefacts arising from the taper;
performing the spectral filtering operation on the model of the taper to form the model of the spectral artefacts; and
adaptively subtracting the model of the spectral artefacts from the filtered data set to form a product data set.

23. A method of geophysical prospecting, the method comprising:
obtaining a data set having a finite aperture, wherein the data set is formed by directing an energy wave toward a location of geologic interest, detecting the energy returned from the location of geologic interest using a plurality of finite-aperture sensors distributed in at least two spatial dimensions, and representing the detected energy in the data set stored in a computer;
increasing clarity of geologic features represented in the data set by removing spectral artefacts from the data set by:
adding a taper to the data set at a boundary of the finite aperture using an extrapolation and a first window function to form a tapered data set;
creating a model of the taper using a second window function;
separating upgoing and downgoing wavefields in the tapered data set with a wavefield separation operation to form a filtered data set having the spectral artefacts, wherein the spectral artefacts arise from the taper;
separating upgoing and downgoing wavefields in the model of the taper with the wavefield separation operation to form a filtered model set, wherein:
the wavefield separation operation comprises performing an integral transform operation from a space-time domain to a frequency-wavenumber domain, applying one or more filters, and performing a reverse integral transform operation from the frequency-wavenumber domain to the space-time domain, and
the space-time domain comprises the at least two spatial dimensions in which the plurality of finite-aperture sensors are distributed; and
adaptively subtracting the filtered model set from the filtered data set to form a product data set having less than all of the spectral artefacts.

24. A system for increasing clarity of geologic features represented in a data set having a finite aperture by removing spectral artefacts from the data set comprising:
a tapering means for adding a taper to the data set at a boundary of the finite aperture using an extrapolation and a first window function to form a tapered data set;
a modeling means for creating a model of the taper for the data set using a second window function,
a filtering means for:
performing a spectral filtering operation on the tapered data set to form a filtered data set, wherein the filtered data set has spectral artefacts arising from the taper; and
performing the spectral filtering operation on the model of the taper to form a model of the spectral artefacts; and
a subtracting means for adaptively subtracting the model of the spectral artefacts from the filtered data set to form a product data set.

* * * * *